US009055217B2

(12) United States Patent
Naito

(10) Patent No.: US 9,055,217 B2
(45) Date of Patent: Jun. 9, 2015

(54) IMAGE COMPOSITING APPARATUS, IMAGE COMPOSITING METHOD AND PROGRAM RECORDING DEVICE

(75) Inventor: Yukihiro Naito, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 322 days.

(21) Appl. No.: 13/451,905

(22) Filed: Apr. 20, 2012

(65) Prior Publication Data

US 2012/0269444 A1 Oct. 25, 2012

(30) Foreign Application Priority Data

Apr. 25, 2011 (JP) .................................. 2011-097282

(51) Int. Cl.
G06K 9/48 (2006.01)
H04N 5/232 (2006.01)
(52) U.S. Cl.
CPC ....... H04N 5/23229 (2013.01); H04N 5/23254 (2013.01); H04N 5/23267 (2013.01)
(58) Field of Classification Search
CPC .................................................. H04N 7/0157
USPC .......................................................... 382/197
See application file for complete search history.

(56) References Cited

U.S. PATENT DOCUMENTS

| 6,594,397 B1* | 7/2003 | Hu ................................. 382/236 |
| 6,674,799 B2* | 1/2004 | Rhee ......................... 375/240.21 |
| 7,075,988 B2* | 7/2006 | Lee et al. ...................... 348/459 |
| 8,059,157 B2* | 11/2011 | Kuo et al. .................. 348/208.6 |
| 8,750,635 B2* | 6/2014 | Yokokawa et al. ............ 382/236 |
| 2005/0249288 A1* | 11/2005 | Ha ............................. 375/240.16 |
| 2009/0074071 A1* | 3/2009 | Nagumo et al. .......... 375/240.16 |
| 2009/0232216 A1* | 9/2009 | Kurata ....................... 375/240.16 |
| 2009/0285301 A1* | 11/2009 | Kurata ....................... 375/240.16 |
| 2011/0007211 A1* | 1/2011 | Toda ............................... 348/452 |
| 2011/0013039 A1* | 1/2011 | Aisaka et al. .............. 348/222.1 |
| 2011/0051816 A1* | 3/2011 | Kitamura ................. 375/240.24 |
| 2011/0103480 A1* | 5/2011 | Dane ......................... 375/240.16 |

FOREIGN PATENT DOCUMENTS

| JP | 2007-36741 A | 2/2007 |
| JP | 2010-147985 A | 7/2010 |
| JP | 2010-252313 A | 11/2010 |

* cited by examiner

Primary Examiner — Michelle Entezari
(74) Attorney, Agent, or Firm — Holtz, Holtz, Goodman & Chick PC

(57) ABSTRACT

A moving region information calculation unit calculates moving region information from a global motion vector and a local motion vector. An image correction unit generates a corrected reference image obtained by correcting a reference image based on the global motion vector and a corrected reference image obtained by correcting the reference image based on the local motion vector. A composition unit composites a base image with the corrected reference images with composition ratios determined based on the moving region information. The composition ratio of the corrected reference image corrected based on the global motion vector is higher than the composition ratio of the corrected reference image corrected based on the local motion vector in a region having the moving region information indicative of a moving region.

13 Claims, 7 Drawing Sheets

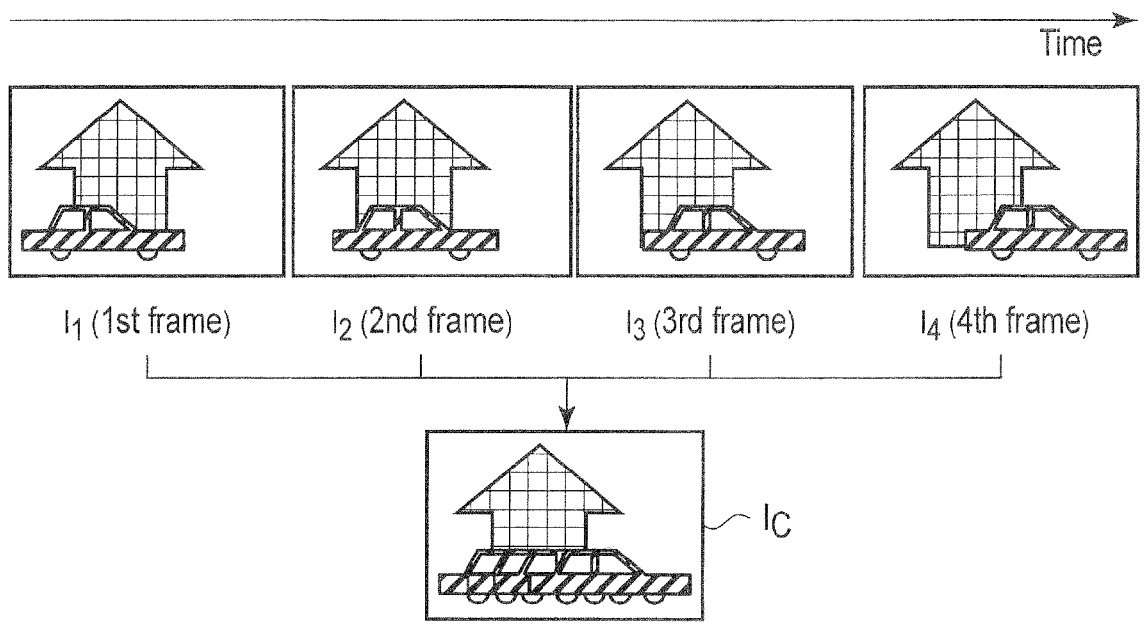
F I G. 1
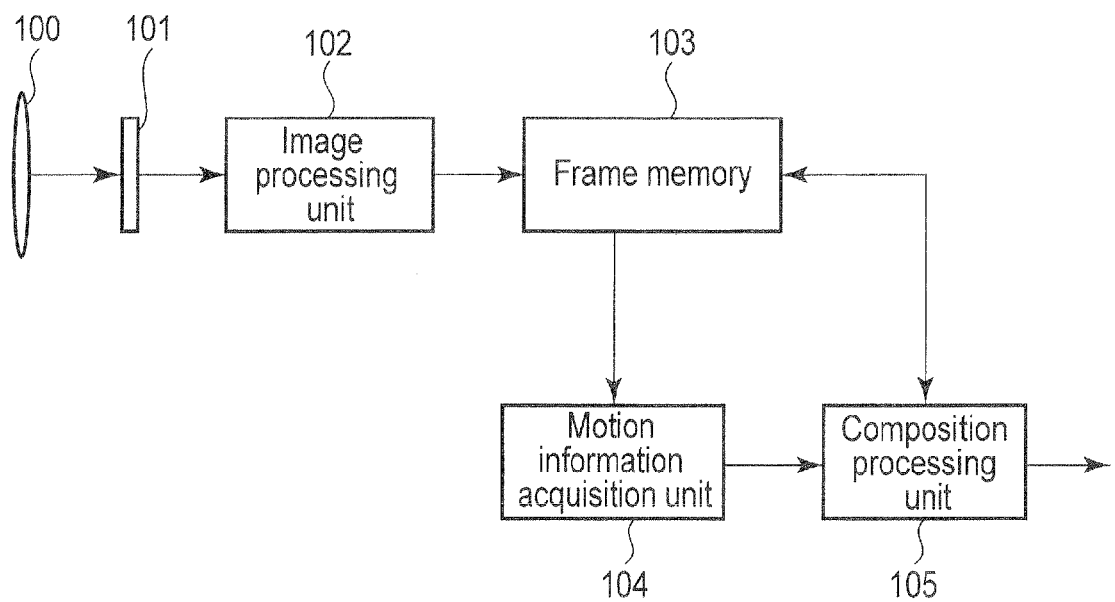
F I G. 2

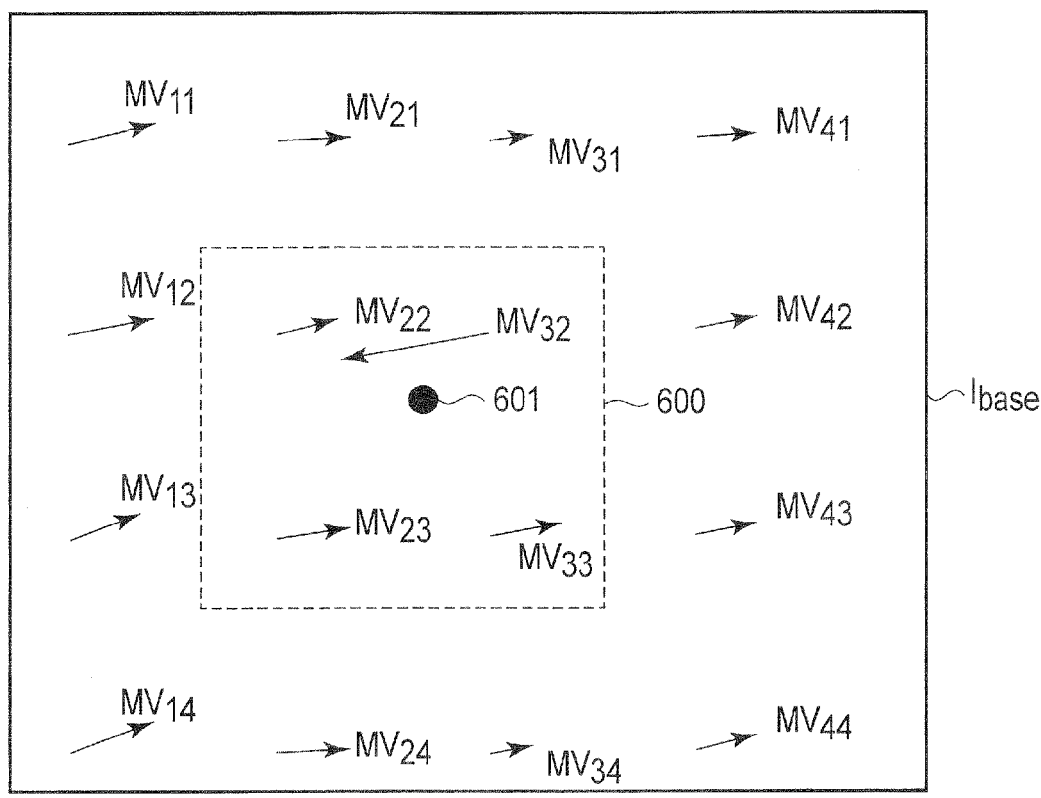
F I G. 6
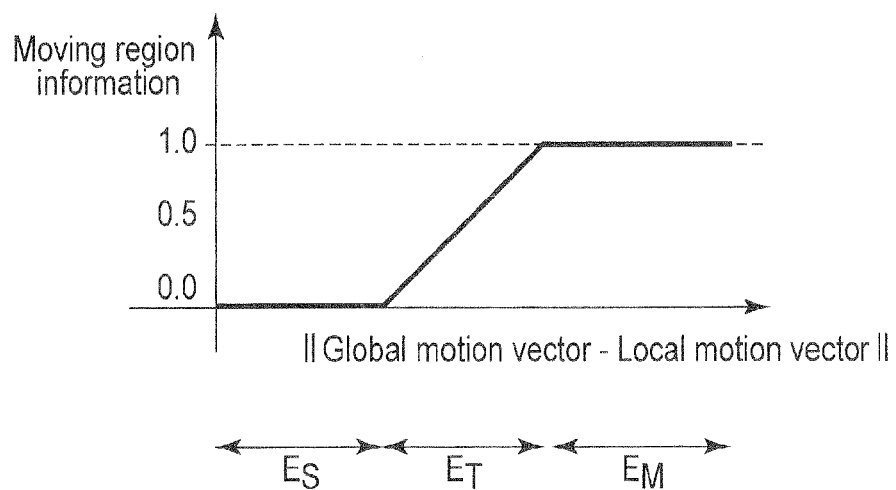
F I G. 7

IMAGE COMPOSITING APPARATUS, IMAGE COMPOSITING METHOD AND PROGRAM RECORDING DEVICE

CROSS-REFERENCE TO RELATED APPLICATIONS

This application is based upon and claims the benefit of priority from prior Japanese Patent Application No. 2011-097282, filed Apr. 25, 2011, the entire contents of which are incorporated herein by reference.

BACKGROUND OF THE INVENTION

1. Field of the Invention

The present invention relates to composition of images acquired in time-series.

2. Description of the Related Art

In an imaging device such as a digital camera, a multi-exposure system for compositing continuously acquired still images to create one still image is known. Such composition of continuously acquired images enables obtaining one image having a trajectory of a moving subject shown therein. To obtain an excellent composite image, images to be composited must be positioned. For example, Jpn. Pat. Appln. KOKAI Publication No. 2010-252313 discloses a system for positioning images based on a global motion vector representing motions of entire images to eliminate an influence of camera shake of continuously acquired images and then compositing the images.

On the other hand, in general, when compositing images while positioning them, there is also a system for using a local motion vector that differs depending on each position in images to carry out positioning and composition, in place of obtaining one global motion vector with respect to the images. For example, Jpn. Pat. Appln. KOKAI Publication No. 2007-36741 discloses a system that can cope with a situation that subjects moving in multiple directions are present in images by increasing the number of target blocks for obtaining a motion vector. Further, Embodiment 1 of this publication discloses a system for detecting mobile objects or subjects, detecting a local motion vector in each region, and selecting an appropriate motion vector at each position in images from the motion vectors. Furthermore, Jpn. Pat. Appln. KOKAI Publication No. 2010-1479.85 discloses a system for compositing images while performing positioning based on composition of local motion vectors and a global motion vector.

BRIEF SUMMARY OF THE INVENTION

According to a first aspect of the invention, there is provided an image compositing apparatus including:

a motion vector calculation unit configured to calculate a global motion vector reflecting an inter-image global motion of a base image and a reference image and calculate a local motion vector reflecting an inter-image local motion between the base image and the reference image for one of a pixel and a unit region consisting of pixels;

a moving region information calculation unit configured to calculate moving region information from the global motion vector and the local motion vector;

an image correction unit configured to generate a corrected reference image obtained by correcting the reference image based on the global motion vector and a corrected reference image obtained by correcting the reference image based on the local motion vector; and a composition unit configured to composite the base image with the corrected reference image corrected based on the global motion vector and the corrected reference image corrected based on the local motion vector with composition ratios determined based on the moving region information, wherein the composition ratio of the corrected reference image corrected based on the global motion vector is higher than the composition ratio of the corrected reference image corrected based on the local motion vector in a region having the moving region information indicative of a moving region.

According to a second aspect of the invention, there is provided an image compositing method including:

calculating a global motion vector reflecting an inter-image global motion of a base image and a reference image and calculating a local motion vector reflecting an inter-image local motion between the base image and the reference image for one of a pixel and a unit region consisting of pixels;

calculating moving region information from the global motion vector and the local motion vector;

generating a corrected reference image obtained by correcting the reference image based on the global motion vector and a corrected reference image obtained by correcting the reference image based on the local motion vector; and compositing the base image with the corrected reference image corrected based on the global motion vector and the corrected reference image corrected based on the local motion vector with composition ratios determined based on the moving region information, wherein the composition ratio of the corrected reference image corrected based on the global motion vector is higher than the composition ratio of the corrected reference image corrected based on the local motion vector in a region having the moving region information indicative of a moving region.

According to a third aspect of the invention, there is provided a program recording device that stores a program which is executed by a computer, the program causing the computer to:

calculate a global motion vector reflecting an inter-image global motion of a base image and a reference image and calculate a local motion vector reflecting an inter-image local motion between the base image and the reference image for one of pixel and a unit region consisting of pixels;

calculate moving region information from the global motion vector and the local motion vector;

generate a corrected reference image obtained by correcting the reference image based on the global motion vector and a corrected reference image obtained by correcting the reference image based on the local motion vector; and composite the base image with the corrected reference image corrected based on the global motion vector and the corrected reference image corrected based on the local motion vector with composition ratios determined based on the moving region information, wherein the composition ratio of the corrected reference image corrected based on the global motion vector is higher than the composition ratio of the corrected reference image corrected based on the local motion vector in a region having the moving region information indicative of a moving region.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view for explaining generation of a trajectory image;

FIG. 2 is a view showing a structural example of an imaging device to which an image compositing apparatus according to a first embodiment of the present invention is applied;

FIG. 6 is a view for explaining operations of a first motion vector candidate determination unit and a second motion vector candidate determination unit;

FIG. 7 is a view for explaining an example of an operation of a moving region information calculation unit;

DETAILED DESCRIPTION OF THE INVENTION

Figure 3:
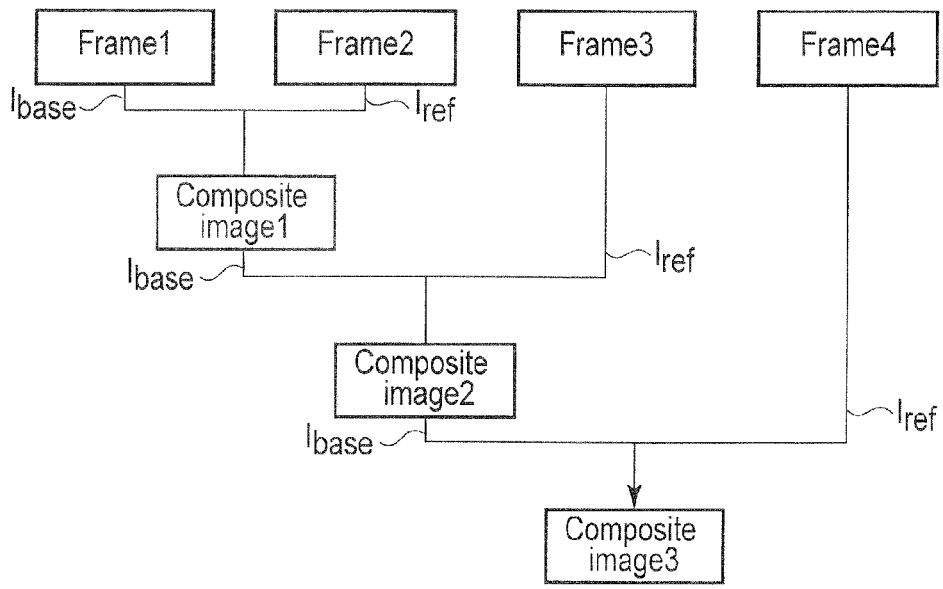
FIG. 3 is a view for explaining a technique of creating one image from four images.

Modes for carrying out the present invention will now be described hereinafter with reference to the accompanying drawings.

First Embodiment

In this embodiment, a description will be given as to generation of a trajectory image in which a moving subject is stable and an effect of suppressing occurrence of blur or multiple images in a still region such as a background portion. FIG. 1 shows an example where images obtained by shooting a moving subject (a vehicle) are used to generate a trajectory image. The moving subject (the vehicle) is continuously shot to obtain images $I_1, I_2, I_3, I_4, \ldots$. In case of compositing these obtained images $I_1, I_2, I_3, I_4, \ldots$, these images are composited while performing positioning so that background positions in the images can coincide with each other. When such composition is carried out, it is possible to obtain one composite image $I_C$ in which the background portion is clearly presented without blurring and a trajectory of the moving subject (the vehicle) is presented by generation of multiple images.

As shown in FIG. 2, an imaging device to which an image compositing apparatus according to the first embodiment of the present invention is applied includes an optical system 100, an imager element 101, an image processing unit 102, a frame memory 103, a motion information acquisition unit 104, and a composition processing unit 105. An image is acquired by the imager element 101 through the optical system 100 constituted of a lens and others. The image processing unit 102 carries out image processing such as color processing or gradation conversion processing with respect to the image acquired by the imager element 101. This image subjected to the image processing is stored in the frame memory 103. When the above-described image acquisition processing is repeated for a predetermined number of images, the images subjected to the image processing are stored in the frame memory 103.

Two images can suffice for the composition processing. In this embodiment, as shown in FIG. 1, an example where four images are target of the composition processing will be described. When the imaging processing is carried out for four times, four images $I_1, I_2, I_3, I_4$, are stored in the frame memory 103.

The motion information acquisition unit 104 reads out two images from the frame memory 103, calculates motion information of the two images, and outputs the calculated motion information to the composition processing unit 105. The composition processing unit 105 reads out the two images from the frame memory 103 and composites the two images based on the motion information output from the motion information acquisition unit 104. Further, the obtained image is stored as a composite image in the frame memory 103. This calculation of the motion information and the composition based on this information are repeated, all images are processed, and then the composition processing unit 105 outputs a final image as a composite image $I_C$ to the outside.

FIG. 3 shows an example of compositing one image from four images. The four images are determined as a frame 1 to a frame 4. In regard to the composition, basic processing, i.e., compositing one image from two images is executed for three times, whereby one composite image is eventually obtained from four images. Based on such a composition system, a scale of hardware can be reduced. Specifically, the frame 1 and the frame 2 are first composited to generate a composite image 1. At the time of composition, one is defined as a base image $I_{base}$, and the other is defined as a reference image $I_{ref}$. Then, the composite image as the base image $I_{base}$ is composited with the frame 3 as the reference image $I_{ref}$ to generate a composite image 2. Finally, the composite image 2 as the base image $I_{base}$ is composited with the frame 4 as the reference image $I_{ref}$ to generate a composite image 3 as a final result. This composite image 3 becomes the composite image $I_C$.

Operations of the motion information acquisition unit 104 and the composition processing unit 105 will be described hereinafter while determining two images, i.e., the frame 1 which is the base image $I_{base}$ and the frame 2 which is the reference image $I_{ref}$ as processing targets. It is to be noted that the motion information acquisition unit 104 acquires motions of the base image $I_{base}$ and the reference image $I_{ref}$ stored in the frame memory 103 as motion information. In this embodiment, the motion information acquisition unit 104 uses a block matching method to output motion vectors at positions set in images.

Figure 4:
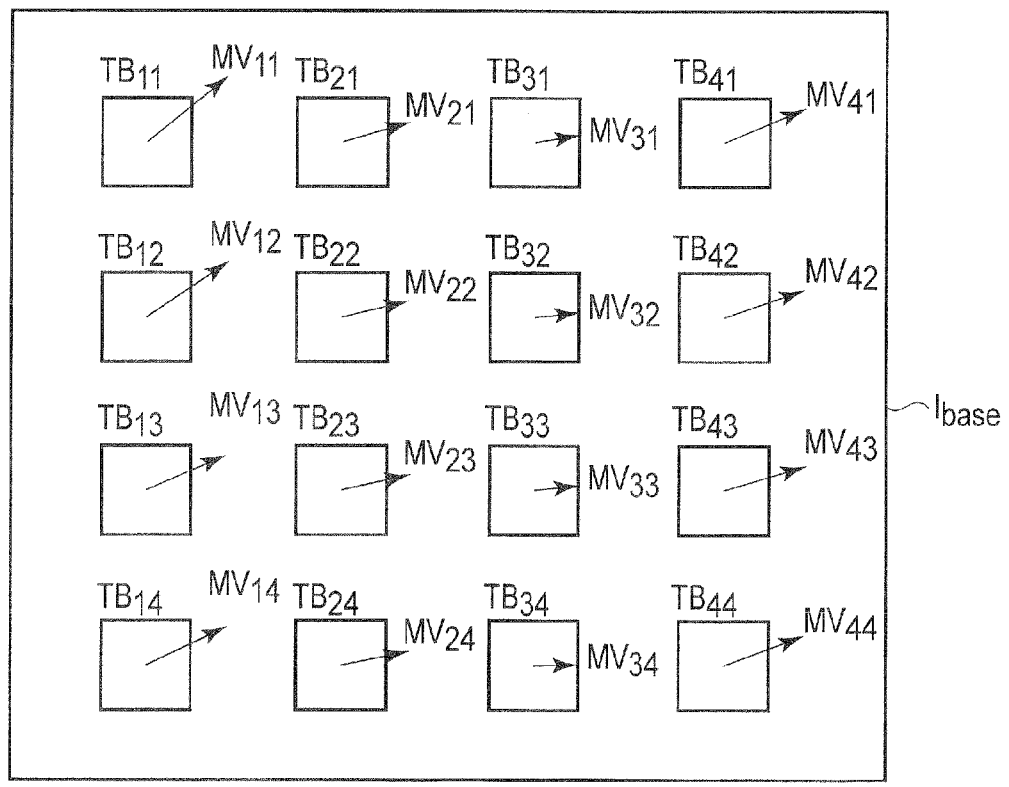
FIG. 4 is a view for explaining a block matching method.

According to the block matching method, the motion information acquisition unit 104 first sets target blocks in the base image $I_{base}$. In an example of FIG. 4, four target blocks in the horizontal direction and four target blocks in the vertical blocks, i.e., a total of 16 target blocks ($TB_{11}$ to $TB_{44}$) are set in the example of FIG. 4. Furthermore, the motion information acquisition unit 104 sets a motion vector search region in the reference image $I_{ref}$ with respect to each of these target blocks. Thereafter, the motion information acquisition unit 104 detects from each target block a motion vector that minimizes an SAD value (a sum of absolute differences in a block) between the target block and its corresponding motion vector search region. Furthermore, the motion information acquisition unit 104 outputs each of detected motion vectors ($MV_{11}$ to $MV_{44}$) to the composition processing unit 105.

Figure 5:
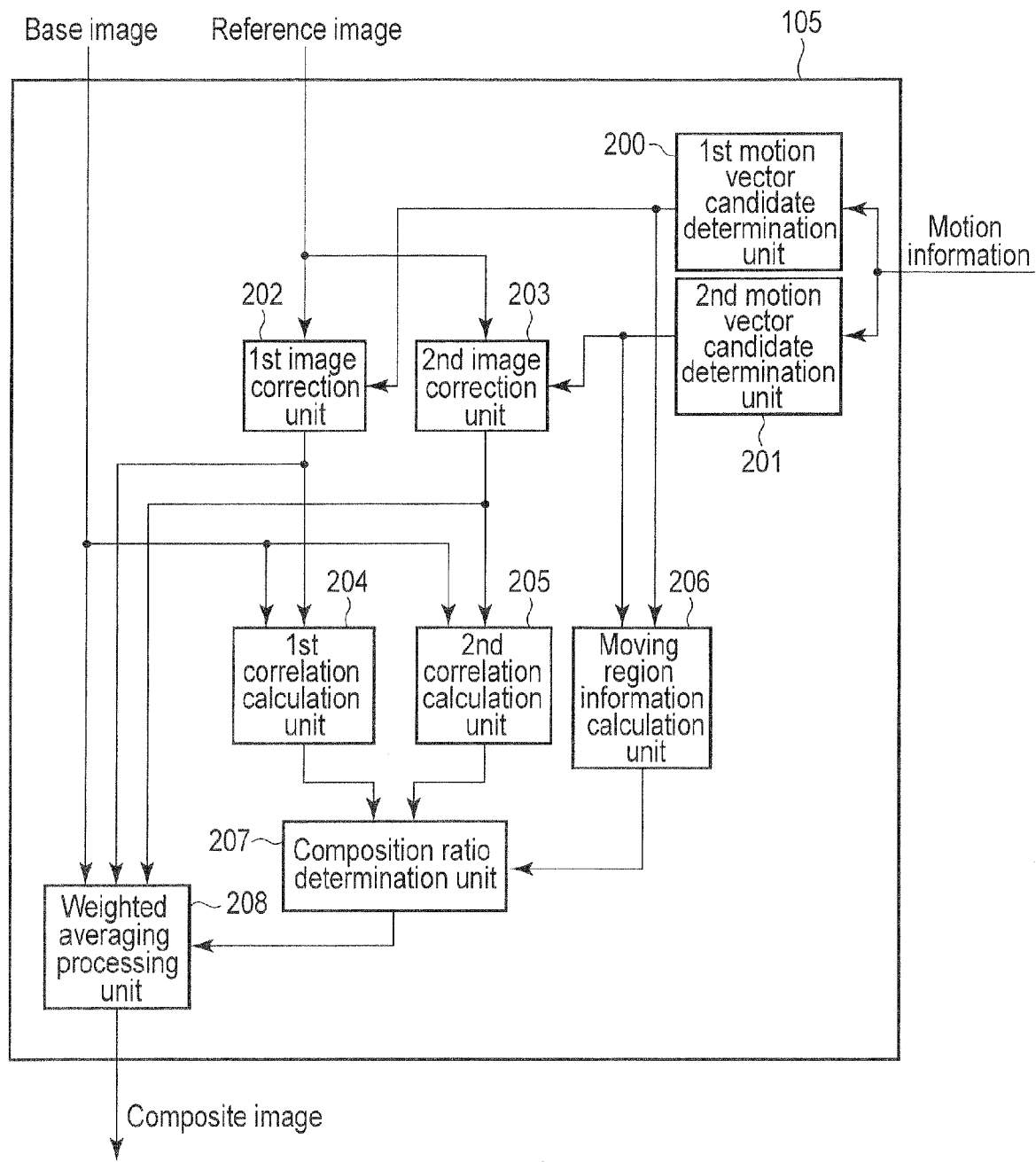
FIG. 5 is a view showing a configuration of a composition processing unit.

The composition processing unit 105 composites the base image $I_{base}$ with the reference image $I_{ref}$ based on motion information (the motion vectors for the number of target blocks) output from the motion information acquisition unit 104. As shown in FIG. 5, the composition processing unit 105 is constituted of a first motion vector candidate determination unit 200, a second motion vector candidate determination unit 201, a first image correction unit 202, a second image correction unit 203, a first correlation calculation unit 204, a second correlation calculation unit 205, a moving region information calculation unit 206, a composition ratio determination unit 207, and a weighted averaging processing unit 208.

The first motion vector candidate determination unit 200 calculates a motion vector of a processing target pixel from motion information (the motion vectors) output from the motion information acquisition unit 104. This motion vector of the processing target pixel is a local motion vector reflecting an inter-image local motion between the base image $I_{base}$ and the reference image $I_{ref}$. When calculating this motion vector of the processing target pixel, motion information to be referred to is motion information in a narrow region around the processing target pixel.

The second motion vector candidate determination unit 201 calculates motion information of an entire screen from the motion information (the motion vectors) output from the motion information acquisition unit 104. This motion information of the entire screen is a global motion vector reflecting an inter-image global motion of the base image $I_{base}$ and the reference image $I_{ref}$.

A calculation method for a first motion vector and a second motion vector will now be described with reference to FIG. 6. Motion vectors in FIG. 6, four vectors $MV_{22}$, $MV_{32}$, $MV_{23}$, and $MV_{33}$) detected by the motion information acquisition unit 104 are present in a target region 600 of a predetermined size having a processing target pixel 601 in the base image $I_{base}$ at the center. The first motion vector candidate determination unit 200 calculates a local motion vector at a position of the processing target pixel 601 based on the four motion vectors ($MV_{22}$, $MV_{32}$, $MV_{23}$, and $MV_{33}$) near the processing target pixel 601. The calculation method may be an average value of the four vectors or weighted average processing considering the position of the processing target pixel 601 and a position of each motion vector.

When the processing is performed in this manner, a motion vector determined by the first motion vector candidate determination unit 200 is a motion vector which strongly reflects a local motion in the narrow range and also reflects information of the moving subject.

The second motion vector candidate determination unit 201 calculates a global motion vector based on the motion vectors ($MV_{11}$ to $MV_{44}$) in the entire base image $I_{base}$. The calculation method may be an average value or a weighted average value of the 16 vectors, or these motion vectors may be subjected to histogram processing and a motion vector having the highest occurrence frequency may be adopted.

When the processing is carried out in this manner, the global motion vector determined by the second motion vector candidate determination unit 201 is a motion vector which reflects a global motion in the wide range and also reflects an influence of camera shake or the like.

It is to be noted that the global motion vector may be acquired from a region larger than a region (the target region 600) where the motion information in the narrow region around the processing target pixel is obtained in place of the entire image.

The first image correction unit 202 deforms the reference image $I_{ref}$ based on the local motion vector calculated by the first motion vector candidate determination unit 200 and performs motion compensation to generate a corrected reference image. The second image correction unit 203 deforms the reference image $I_{ref}$ based on the global motion vector calculated by the second motion vector candidate determination unit 201 and performs the motion compensation to generate a corrected reference image. Specifically, a pixel position of the reference image $I_{ref}$ associated with a position of the processing target pixel in the base image $I_{base}$ is calculated from each motion vector to obtain a pixel value. Moreover, this pixel value is set to a corrected pixel value of the corrected reference image.

The first correlation calculation unit 204 calculates a correlation between the processing target pixel in the base image $I_{base}$ and the pixel in the corrected reference image associated by the first image correction unit 202. The second correlation calculation unit 205 calculates a correlation between the processing target pixel in the base image $I_{base}$ and the pixel in the corrected reference image associated by the second image correction unit 203. In regard to these correlation calculations, specifically, an absolute value of a difference between the pixel value of the base image $I_{base}$ and the pixel value of the corrected reference image associated therewith can be obtained, for example.

When the absolute value of the difference is small (when the correlation is large), the motion vector is highly possibly appropriate, and blur or multiple images are unlikely to occur even if this motion vector is used in the composition processing. On the other hand, when the absolute value of the difference is large (when the correlation is small), the motion vector is possibly inappropriate, and blur or multiple images are likely to occur when this motion vector is used in the composition processing. However, in a region where the composition of images of a trajectory of the moving subject is desired, this value can usually increase.

It is to be noted that the correlation may be a sum of absolute differences in a small block (e.g., 3×3 pixels or 5×5 pixels) in place of the absolute difference of the pixel value. In this case, the pixel value of the base image $I_{base}$ to be used is a pixel value of a small block around the processing target pixel, and the pixel value of the reference image $I_{ref}$ is a pixel value of corresponding small block in an image obtained by correcting the reference image $I_{ref}$ using each motion vector.

The moving region information calculation unit 206 compares the local motion vector determined by the first motion vector candidate determination unit 200 with the global motion vector determined by the second motion vector candidate determination unit 201. Additionally, a judgment is made upon whether the position of the processing target pixel is present in a region where the moving subject is present or a still region such as a background portion based on a result of this comparison.

FIG. 7 is a view for explaining a calculation method of moving region information output by the moving region information calculation unit 206. An abscissa in FIG. 7 represents magnitude of a difference vector between the global motion vector and the local motion vector. The moving region information calculation unit 206 sets such a graph of characteristics as depicted in FIG. 7 for the magnitude of this different vector based on a technique such as tabulation in advance to obtain moving region information.

It can be considered that a region where a difference between the global motion vector and the local motion vector is small is a still region $E_S$ where the subject is not moving. Therefore, the moving region information calculation unit 206 outputs 0.0 as the moving region information. On the other hand, it can be considered that a region where this difference is large is a moving region $E_M$ where the subject is moving. Therefore, the moving region information calculation unit 206 outputs 1.0 as the moving region information. Additionally, a region where this difference is moderate is set as a transition region $E_T$ that cannot be clearly determined as the still region $E_S$ or the moving region $E_M$, and the moving region information calculation unit 206 outputs a value from 0.0 to 1.0 as the moving region information as shown in FIG. 7

The composition ratio determination unit 207 determines a weight (a composition ratio) in the weighted averaging processing unit 208 based on the correlation values (the absolute differences) calculated by the first correlation calculation unit 204 and the second correlation calculation unit 205 and the moving region information output from the moving region information calculation unit 206. Hereinafter, a composition ratio 1 is a weight of the output pixel value of the first image correction unit 202 when a weight of the pixel value of the base image $I_{base}$ is 1.0. Similarly, a composition ratio 2 is a weight of the output pixel value of the second image correction unit 203 when a weight of the pixel value of the base image $I_{base}$.

When the region in question is the still region $E_S$ and hence the moving region information is 0.0, occurrence of blur or multiple images due to composition must cc suppressed. Therefore, the composition ratio determination unit 207 selects an appropriate one from the corrected image corrected using the global motion vector and the corrected image corrected using the local motion vector, as the reference image $I_{ref}$ which is the composition target.

Figure 8:
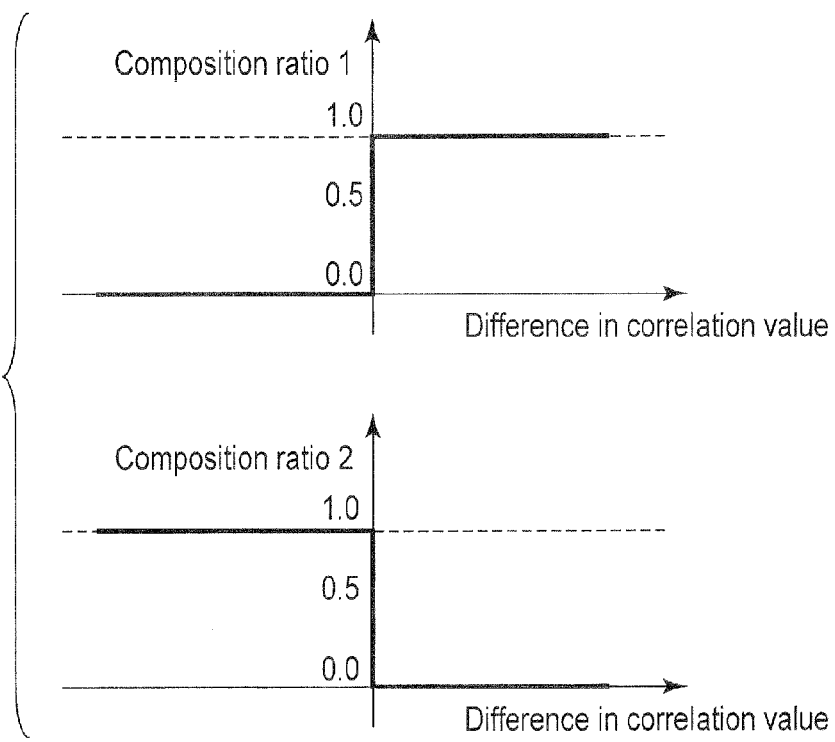
FIG. 8 is a view for explaining an example of an operation of a composition ratio determination unit.

FIG. 8 shows an example of a determination method of the composition ratio 1 and the composition ratio 2 when the moving region information is 0.0. A "difference in correlation value" in the drawing is a value obtained by subtracting an output value (the absolute difference) of the first correlation calculation unit 204 from an output value (the absolute difference) of the second correlation calculation unit 205. When the difference between the correlation values is a positive value, this means that the output pixel value of the first pixel correction unit 202 has a high correlation with respect to the pixel value of the base image $I_{base}$. Conversely, when the difference between the correlation values is a negative value, this means that the output pixel value of the second image correction unit 203 has a high correlation with respect to the pixel value of the base image $I_{base}$.

In the example shown in FIG. 8, one having a higher correlation with respect to the pixel value of the base image $I_{base}$ in the output pixel value of the first image correction unit 202 and the output pixel value of the second image correction unit 203 is solely used in composition in the weighted averaging processing unit 208.

Figure 9:
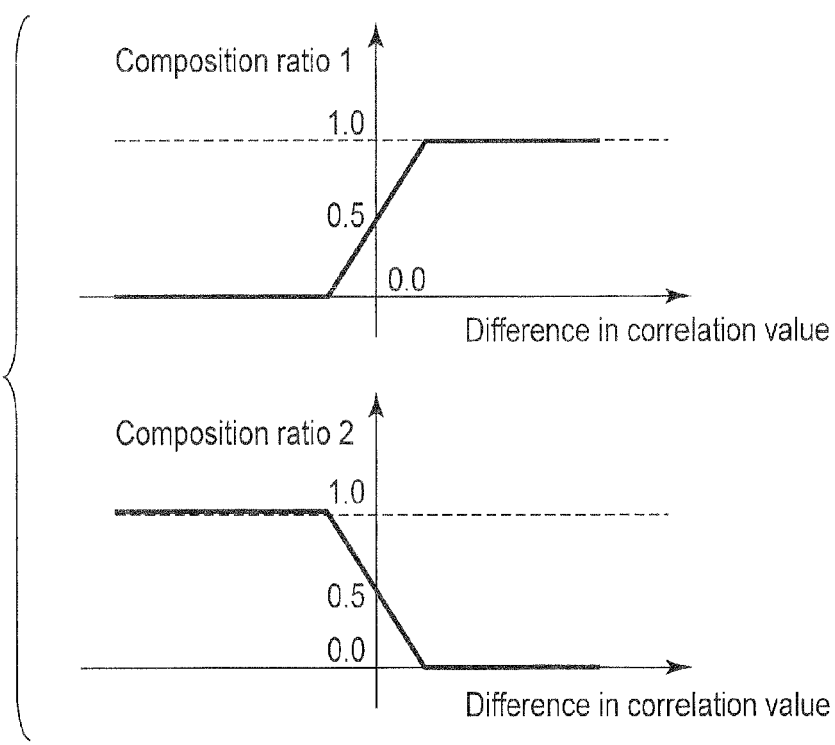
FIG. 9 is a view for explaining another example of the operation of the composition ratio determination unit.

Besides, like an example shown in FIG. 9, when an absolute value of a difference between the correlation values is small, moderately changing the composition ratio from 0.0 to 1.0 enables using both the pixel values for composition.

Further, when both the correlation values calculated by the first correlation calculation unit 204 and the second correlation calculation unit 205 are smaller than a predetermined threshold value (when both the absolute differences of the pixel values are larger than a predetermined threshold value), it can be determined that, both the motion vector candidates are inappropriate in such a case, the composition ratio determination unit 207 sets the composition ratio 1 and the composition ratio 2 to 0.0 to prevent, both the pixels from being used for composition.

A situation where the region in question is the moving region $E_M$ and hence have the moving region information is 1.0 will now be described. In the moving region $E_M$, to show a trajectory image, the reference image $I_{ref}$ as the composition target is a corrected image corrected using the global motion vector. Therefore, the composition ratio determination unit 207 sets the composition ratio 1 to 0.0 and sets the composition ratio 2 to 1.0.

Furthermore, when the region in question is the transition region $E_T$ and hence the moving region information is 0.0 to 1.0, the following operation can be performed. That as the composition ratio 1 and the composition ratio 2, the composition ratio determination unit 207 determines values linearly interpolated between a pair of the composition ratio 1 and the composition ratio 2 when the moving region information is 0.0 and a pair of the composition ratio 1 and the composition ratio 2 when the moving region information is 1.0, in accordance with the moving region information. Based on such determination, it is possible to ease a sudden change in picture quality due to a precipitous variation in the moving region $E_M$ and the still region $E_S$.

The weighted averaging processing unit 208 performs weighted averaging processing with respect to the pixel in the base image $I_{base}$, the output pixel of the first image correction unit 202, and the output pixel of the second image correction unit 203 based on the composition ratios output from the composition ratio determination unit 207, and determines a result of this processing as a pixel of a composite image.

The above is the description on the composition in the first stage, i.e., a case that the frame 1 as the reference pixel $I_{base}$ and the frame 2 as the reference image $I_{ref}$ are processing targets. The composite image 1 in FIG. 3 is stored in the frame memory 103, and it is used for composition with the frame 3 in FIG. 3.

Composition of the composite image 1 and the frame 3 as composition in the second stage and composition of a composite image 2 resulting from composition in the second stage and the frame 4 as composition in the third stage can be performed like the composite image 1. However, in this case, the composition ratios of the base image $I_{base}$ and the reference image $I_{ref}$ must be adjusted.

In the moving region $E_M$, it is desirable for the frame 1 to frame 4 to be all composited at the same ratio as a final composition result. To obtain such a result, for example, the composition ratios of the composite image 2 and the frame 4 must be set to 3.0 to 1.0 in place of 1.0 to 1.0. That is because three images, i.e., the frame 1 to the frame 3 have been already composited in the composite image 2. Therefore, the weighted averaging processing unit 208 adjusts the composition ratio of the base image in accordance with the number of stages of composition.

Such processing is executed with respect to all pixels in the images to obtain the composite image $I_C$. It is to be noted that the example where the first motion vector candidate determination unit 200 and the second motion vector candidate determination unit 201 calculate the candidate motion vectors in accordance with each pixel in all pixels in the images has been described in this embodiment. However, the candidate motion vectors can be calculated in accordance with each unit region consisting of pixels. For example, a unit region is determined as a block including 16×16 pixels, and the same motion vector candidates are used in this block. Performing such an operation enables reducing an amount of calculation required to determine the motion vector candidates.

Furthermore, in this embodiment, the global motion vector is calculated based on the block matching processing. Instead, the global motion vector may be calculated based on information obtained from, e.g., a blur sensor mounted on the imager device and the like.

Moreover, an image compositing program that realizes functions of the foregoing embodiment can be supplied to a personal computer of a user or a server computer in the form a program recording device, and the computer can execute this image compositing program to realize the above-described functions.

Figure 10:
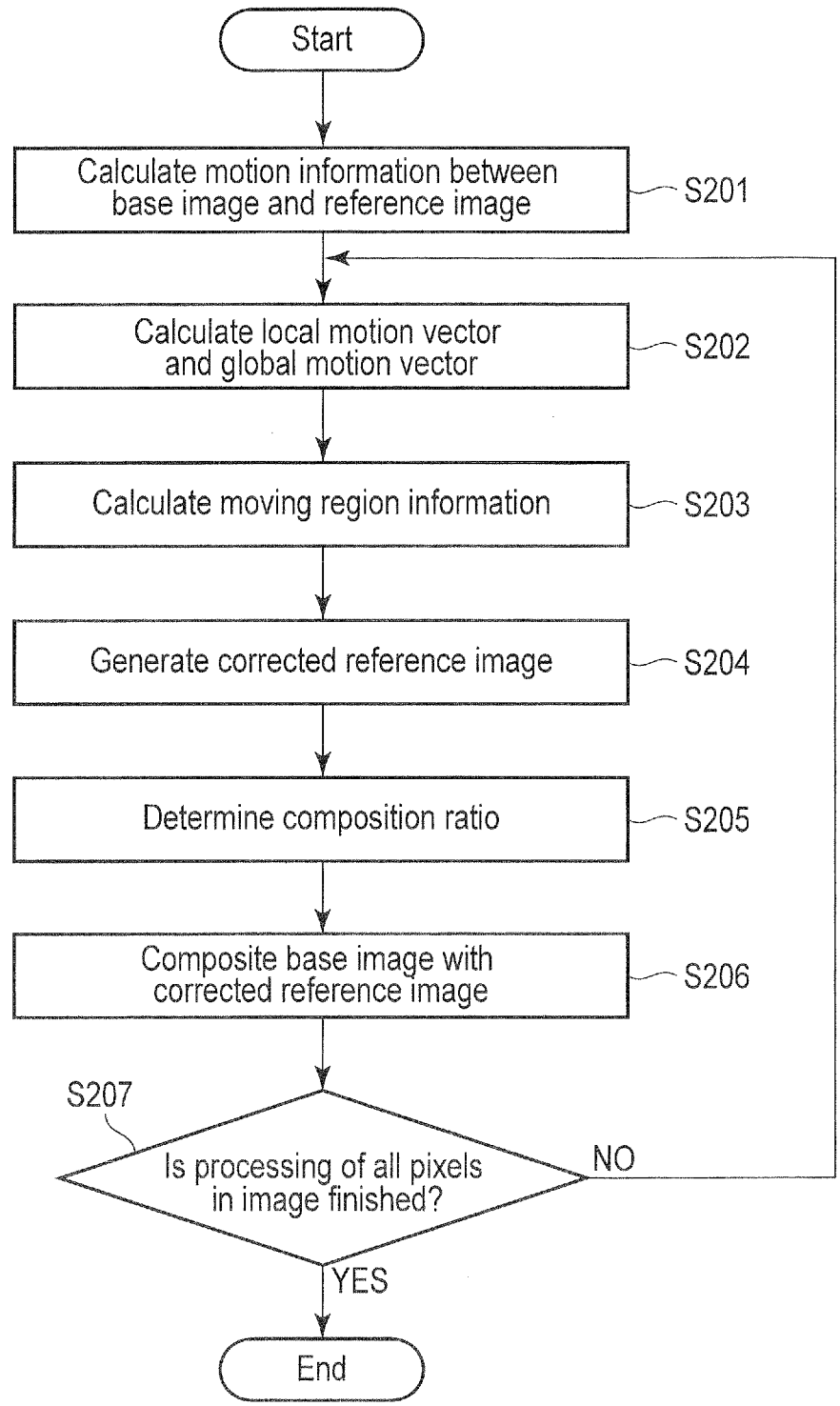
FIG. 10 is a flowchart for explaining image composition processing according to the first embodiment.

FIG. 10 is a flowchart showing an example of such an image compositing program.

When this program is executed by the computer, it first causes the computer to acquire motion information of the base image $I_{base}$ and the reference image $I_{ref}$ stored in a frame memory of this computer (step S201). The motion information can be obtained by using the block matching method to calculate motion vectors at positions set in images.

Subsequently, the program causes the computer to calculate a local motion vector and a global motion vector of a processing target pixel (step S202). At this time, the motion information to be referred to is motion information in a narrow region around the processing target pixel in calculation of the local motion vector, and it is motion information of an entire screen in calculation of the global motion vector.

Then, the program causes the computer is calculate moving region information (step S203). As a calculation method, the local motion vector is compared with the global motion vector to determine whether a position of the processing target pixel is in a moving region $E_M$ where a moving subject or the like is present or a still region $E_S$ such as a background portion.

Subsequently, the program causes the computer to perform motion compensation based on each of the local motion vector and the global motion vector to calculate corrected reference images (step S204). Specifically, pixel positions in the reference image $I_{ref}$ associated with the position of the processing target pixel in the base image $I_{base}$ are calculated from each motion vector, and pixel values are obtained. Thereafter, the program causes the computer to calculate composition ratios of the corrected reference images (step S205). When it is determined from the moving region information that the position of the processing target pixel is in the moving region $E_M$, the composition ratio of the corrected reference image corrected using the global motion vector is set to 1.0, and the corrected reference image corrected using the local motion vector is set to 0.0. Moreover, when it is determined from the moving region information that the position of the processing target pixel is in the still region $E_S$, the composition ratio of each corrected reference image is set based on a correlation between each corrected reference image and the base image $I_{base}$.

Subsequently, the program cause the computer to perform weighted averaging with respect to the base image $I_{base}$ and each corrected reference image in accordance with the set composition ratios to generate a composite image (step S206).

Then, the program causes the computer to determine whether processing for all pixels in the images has been finished (step S207). When the processing for all pixels in the images has not been finished yet, the program causes the computer to repeat the processing from the step S202. Additionally, when the processing for all pixels in the images has been finished, the image composition processing of the base image $I_{base}$ and the reference image $I_{ref}$ is terminated.

It is to be noted that a composition result obtained at the step S206 is stored at a position of the corresponding pixel in the composite image in the frame memory of the computer every time, whereby the composite image is stored in the frame memory. Alternatively, the composition result obtained at the step S206 may be accumulated in a work memory provided in the computer, and a composite image formed in the work memory may be written into the frame memory in accordance with end of the processing for all pixels in the images.

In this manner, the composite image of the frame 1 as the base image $I_{base}$ and the frame 2 as the reference image $I_{ref}$ is stored in the frame memory of the computer. Further, this composite image is determined as the base image $I_{base}$ and used for composition with the next frame 3.

The program causes computer to repeat such composition of the images and output a final composite image.

Like this embodiment, the moving region information calculation unit 206 determines which one of the moving region. $E_M$ where a trajectory should be shown and the still region $E_S$ where occurrence of blur or multiple images should be suppressed the processing target pixel is present in, and composition ratios are appropriately set based on a corrected reference image obtained by correcting the reference image as the composition target using the global motion vector and corrected reference image obtained by correcting the reference image using the local motion vector in accordance with a result of this determination. That is, in the moving region $E_M$, the composition ratio of the image corrected based on the global motion vector is set to be larger than the composition ratio of the image corrected based on the local motion vector. Adopting such a configuration enables achieving both generation of a stable trajectory image of the subject which should be multiple images and an effect of suppressing occurrence of blur or multiple images in the still region $E_S$, e.g., the background portion as a subject which should be a still image.

Furthermore, like this embodiment, when the moving region information calculation unit 206 determines whether a region in question is the moving region $E_M$ using the local motion vector calculated by the first motion vector candidate determination unit 200 and the global motion vector calculated by the second motion vector candidate determination unit 201, complicated calculation processing does not have to be carried out for determination of the moving region $E_M$, thereby obtaining the effect of suppressing a hardware scale.

Second Embodiment

In the first embodiment, the moving region information calculation unit 206 determines whether the processing target pixel is in the moving region $E_M$ where a trajectory should be shown or the still region $E_S$ where occurrence of blur or multiple images should be suppressed, and the composition ratios of the corrected reference image corrected using the global motion vector and the corrected reference image corrected using the local motion vector are appropriately set in accordance with a result of this determination. In this embodiment, a system simplifying this operation will be described.

Figure 11:
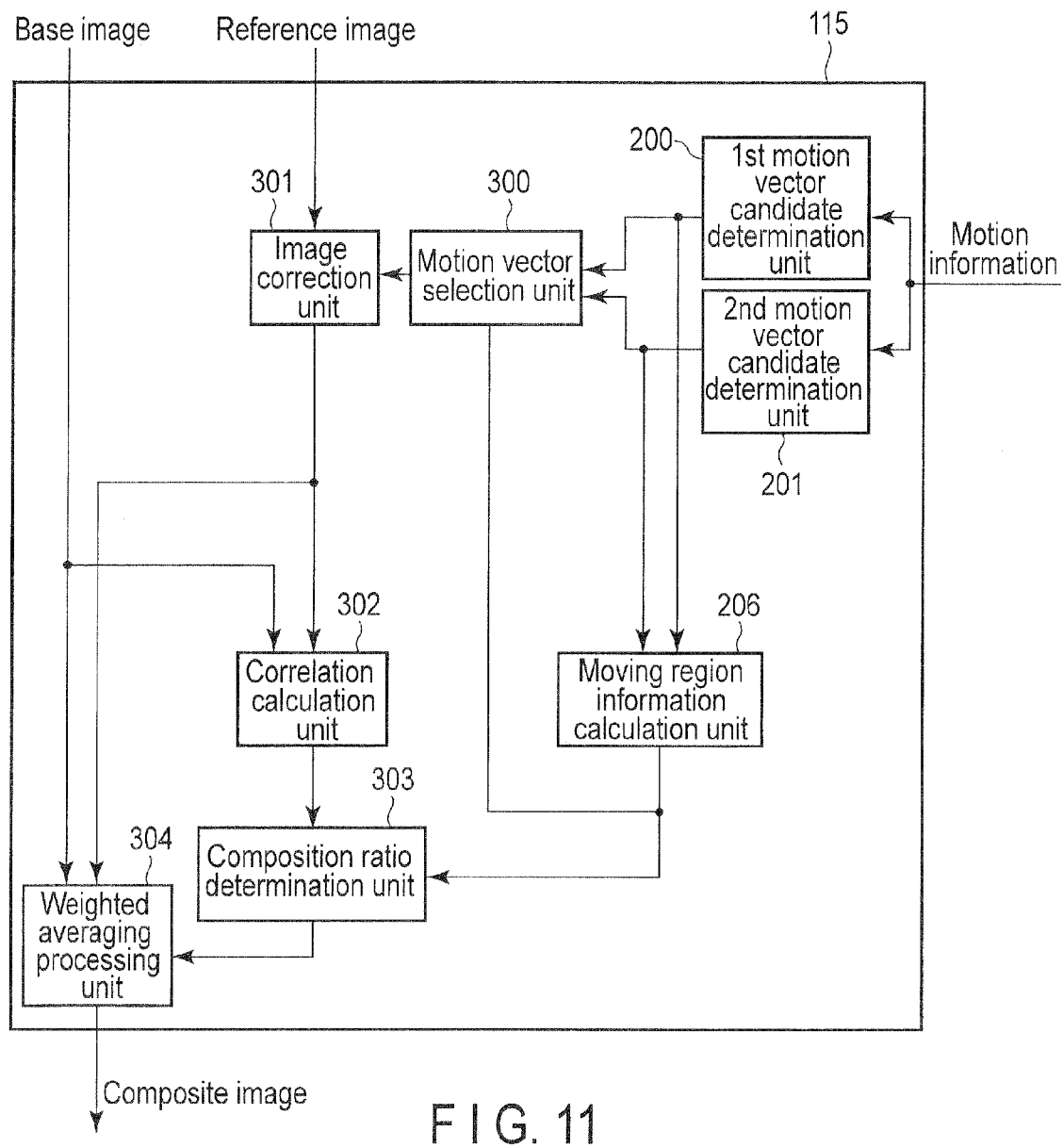
FIG. 11 is a block diagram of a composition processing unit according to a second embodiment of the present invention.

In this embodiment, the composition processing unit 105 in the first embodiment is changed to such a composition processing unit 115 as depicted in FIG. 11 and other structures are equal to those in the first embodiment. Therefore, to avoid overlapping explanation, the composition processing unit 115 alone will be described hereinafter.

As shown in FIG. 11, the composition processing unit 115 is constituted of a first motion vector candidate determination unit 200, a second motion vector candidate determination unit 201, a moving region information calculation unit 206, a motion vector selection unit 300, a image correction unit 301, a correlation calculation unit 302, a composition ratio determination unit 303, and a weighted averaging processing unit 304.

Figure 12:
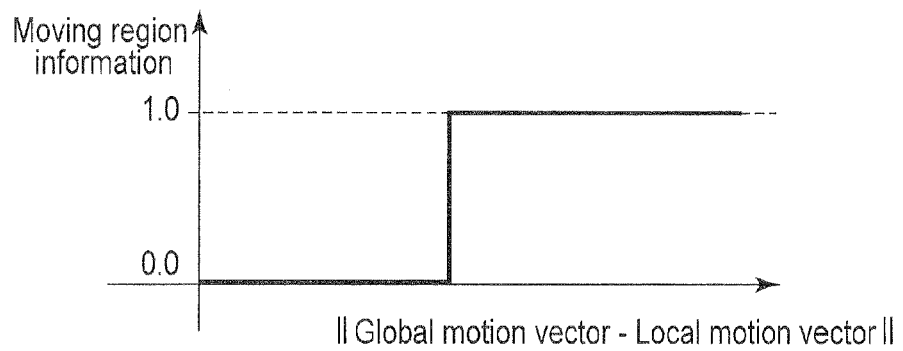
FIG. 12 is a view for explaining an operation of a moving image information calculation unit in the second embodiment.

The first motion vector candidate determination unit 200 and a second motion vector candidate determination unit 201 calculate a local motion vector and a global motion vector like the first embodiment. The moving region information calculation unit 206 determines which one of a moving region $E_M$ where a moving subject is present and a still region $E_S$ such as a background portion a position of a processing target pixel is present in based on such characteristics as depicted in FIG. 12.

The motion vector selection unit 300 selects a motion vector which is adopted at the position of the processing target pixel from the local motion vector and the global motion vector based on a result of the moving region information calculation unit 206. Specifically, in the still region $E_S$ having moving region information set to 0.0, the motion vector selection unit 300 selects the local motion vector having a higher accuracy as a motion vector in order to suppress occurrence of blur or multiple images due to composition. In the moving region $E_M$ having moving region information set to 1.0, the motion vector selection unit 300 selects the global motion vector as the motion vector in order to obtain an effect of showing a trajectory image.

The image correction unit 301 performs motion compensation based on the selected motion vector and generates a corrected reference image. Specifically, this unit calculates a pixel position of a reference image $I_{ref}$ associated with the position of the processing target pixel in a base image $I_{base}$ based on the selected motion vector and obtains a pixel value of this pixel position. The correlation calculation unit 302 calculates a correlation between the processing target pixel in the base image $I_{base}$ and the pixel associated by the image correction unit 301. Specifically, an absolute value or the like of a difference between a pixel value of the base image $I_{base}$ and the pixel value of the corrected reference image associated therewith can be calculated.

When the absolute value of the difference is small (when the correlation is large), the motion vector is highly possibly appropriate, and blur or multiple images are unlikely to occur even though this vector is used in the composition processing. When the absolute value of the difference is large (when the correlation is small), the motion vector is highly possibly inappropriate, and using this vector leads to a high possibility of occurrence of blur or multiple images. However, in the region where compositing trajectories of the moving subject is desired, an increase in this value is usually possible.

It is to be noted that the correlation may be a sum of absolute differences in a small block (3×3 pixels or 5×5 pixels) instead of an absolute difference of the pixel value.

The composition ratio determination unit 303 determines a weight (a composition ratio) in the weighted averaging processing unit 304 in accordance with the absolute difference (the correlation value) calculated by the correlation calculation unit 302 and the moving region information output from the moving region information calculation unit 206. In the following description, the composition ratio is determined as a weight of an output pixel value of the image correction unit 301 when a weight of the pixel value of the base image $I_{base}$ is 1.0.

When the region in question is the still region $E_S$ and hence the moving region information is 0.0, to further suppress occurrence of blur or multiple images due to composition, using the correlation value to control the composition ratio is desirable. When the absolute difference of the pixel value calculated by the correlation calculation unit 302 is higher than a predetermined threshold value (when the correlation value is smaller than a predetermined threshold value), the composition ratio determination unit 303 determines that the selected motion vector is inappropriate. Further, the composition ratio is set to 0.0, and composition is thereby prevented from being performed.

On the other hand, when the absolute difference of the pixel value is smaller than the predetermined threshold value (when the correlation value is larger than the predetermined threshold value), the composition ratio determination unit 303 determines that the selected motion vector is appropriate. Moreover, the composition ratio is set to 1.0, and composition is advanced, and a noise reduction effect and others based on composition can be obtained.

On the other hand, when the region in question is the moving region $E_M$ and hence the moving region information is 1.0, to show a trajectory image, composition must be carried out even though the absolute difference of the pixel value is large (even though the correlation value is small). Therefore, in the moving region $E_M$, the composition ratio determination unit 303 sets the composition ratio to 1.0 irrespective the absolute difference (the correlation value) of the pixel value.

The weighted averaging processing unit 304 performs weighted average processing with respect to the pixel of the base image $I_{base}$ and the output pixel of the image correction unit 301 based on the composition ratio output from the composition ratio determination unit 303 and determines an obtained result as a pixel of the composite image.

The above-described processing is effected with respect to all pixels in the images to obtain the composite image. In this embodiment, the correlation calculation unit 302 and the composition ratio determination unit 303 control the composition ratios in the still region $E_S$. However, it is possible to adopt a simpler configuration that selection of the motion vector in the motion vector selection unit 300 alone is performed without effecting this control.

As described above, like this embodiment, the moving region information calculation unit 206 determines which one of the moving region $E_M$ where a trajectory should be shown and the still region $E_S$ where occurrence of blur or multiple images should be suppressed the processing target image is in, and the composition ratio of the base image $I_{base}$ and the corrected reference image corrected using the global motion vector or the local motion vector is appropriately set in accordance with a result of this determination. That is, in the moving region $E_M$, the composition ratio of the image corrected based on the global motion vector is set to be larger than the composition ratio of the image corrected based on the local motion vector. For example, the base image $I_{base}$ is composited only with the corrected reference image corrected based on the global motion vector. Adopting such a configuration enables achieving both generation of a stable trajectory image of the subject which should be multiple images and an effect of suppressing occurrence of blur or multiple images in the still region $E_S$ which is, e.g., a background portion as a subject that should be a still image.

As described above based on the embodiments, according to the present invention, which one of the moving region $E_M$ and the still image $E_S$ the processing target pixel is in is determined, and the corrected reference image as a composition target is appropriately generated from the corrected reference image corrected using motion vector candidates in accordance with a result. Consequently, it is possible to achieve both generation of a stable trajectory image or generation of multiple images in the moving region $E_M$ and the effect of suppressing occurrence of blur or multiple images in the still region $E_S$.

Moreover, in the moving region $E_M$, the corrected reference image corrected using the global motion vector can be composited with the base image $I_{base}$. In the still region $E_S$, the base image $I_{base}$ can be composited with the corrected reference image obtained by correcting the reference image $I_{ref}$ based on the local motion vector and the corrected reference image obtained by correcting the reference image $I_{ref}$ based on the global motion vector. As a result, it is possible to achieve both generation of a stable trajectory image or multiple images in the moving region $E_M$ and an effect of suppressing occurrence of blur or multiple images in the still region $E_S$.

Additionally, a correlation between each corrected reference image and the base image $I_{base}$ can be obtained. When the base image $I_{base}$ is composited with each corrected reference image in the still region $E_S$ in accordance with the correlation, occurrence of blur or multiple images in the still region $E_S$ can be further suppressed.

Further, correlations of the respective corrected reference images and the base image $I_{base}$ can be compared, and the composition ratio of an image having the large correlation can be set to be larger than the composition ratio of an image having the smaller correlation. As a result, occurrence of blur or multiple images in the still region $E_S$ can be further suppressed.

Furthermore, the corrected reference image obtained by correcting the reference image $I_{ref}$ based on the global motion vector can be composited with the base image $I_{base}$ in the moving region $E_M$, and the corrected reference image obtained by correcting the reference image $I_{ref}$ based on the local motion vector can be composited with the base image $I_{base}$ in the still region $E_S$. As a result, in the simple configuration, it is possible to achieve both generation of a stable trajectory image or multiple images in the moving region $E_M$ and an effect of suppressing occurrence of blur or multiple images in the still region $E_S$.

Moreover, when the global motion vector is determined as a motion of the entire screen due to camera shake and others, it is possible to achieve both generation of a stable trajectory image in the moving region $E_M$ and the effect of suppressing occurrence of blur or multiple images in the still region $E_S$.

Additionally, when moving region information is calculated from a difference between the global motion vector and the local motion vector, the moving region $E_M$ can be highly accurately extracted.

Additional advantages and modifications will readily occur to those skilled in the art. Therefore, the invention in it broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image compositing apparatus comprising:
a motion vector calculation unit configured to calculate a global motion vector reflecting an inter-image global motion of a base image and a reference image and to calculate a local motion vector reflecting an inter-image local motion between the base image and the reference image for one of a pixel and a unit region consisting of pixels;
a moving region information calculation unit configured to calculate moving region information, the moving region information indicating one of a moving region in which a subject is moving and a still region in which the subject is not moving, by estimating, in each unit region, a difference between the global motion vector and the local motion vector, and using a predetermined relationship between the difference and a value of the moving region information;
an image correction unit configured to generate a corrected reference image obtained by correcting the reference image based on the global motion vector and a corrected reference image obtained by correcting the reference image based on the local motion vector;
a composition ratio determining unit configured to determine composition ratios for compositing the base image with the corrected reference image corrected based on the global motion vector and the corrected reference image corrected based on the local motion vector, by using the moving image information calculated by the moving region information calculation unit and correlations between an image pixel of the base image to be processed and a target pixel of the corrected reference images corrected by the image correction unit; and
a composition unit configured to composite the base image with the corrected reference image corrected based on the global motion vector and the corrected reference image corrected based on the local motion vector, with the composition ratios determined by the composition ratio determining unit,
wherein the composition ratio of the corrected reference image corrected based on the global motion vector is higher than the composition ratio of the corrected reference image corrected based on the local motion vector in a region indicated to be the moving region in which an absolute value of the difference between the global motion vector and the local motion vector is at or above a first threshold.

2. The apparatus according to claim 1, wherein the composition unit:
composites the corrected reference image obtained by correcting the reference image based on the global motion vector with the base image in the moving region; and
composites the corrected reference image obtained by correcting the reference image based on the local motion vector and the corrected reference image obtained by correcting the reference image based on the global motion vector with the base image in the still region.

3. The apparatus according to claim 1, further comprising:
a correlation calculation unit configured to calculate the correlations,
wherein the composition ratio determining unit uses the correlations calculated by the correlation calculation unit to determine the composition ratios in the still region.

4. The apparatus according to claim 3, wherein the composition ratio determining unit:
compares the correlation between the corrected reference image obtained by correcting the reference image based on the local motion vector and the base image with the correlation between the corrected reference image obtained by correcting the reference image based on the global motion vector and the base image in the still region; and
sets the composition ratio of the corrected reference image having the higher correlation with respect to the base image to be larger than the composition ratio of the corrected reference image having the smaller correlation.

5. The apparatus according to claim 4, wherein the composition unit composites the corrected reference image having the higher correlation with respect to the base image with the base image.

6. The apparatus according to claim 1, wherein:
the image correction unit:
generates the corrected reference image obtained by correcting the reference image based on the global motion vector in the moving region; and
generates the corrected reference image obtained by correcting the reference image based on the local motion vector in the still region, and
the composition unit:
composites the corrected reference image obtained by correcting the reference image based on the global motion vector with the base image in the moving region; and
composites the corrected reference image obtained by correcting the reference image based on the local motion vector with the base image in the still region.

7. The apparatus according to claim 1, wherein the global motion vector is a motion vector calculated by obtaining the global motion from a motion of an entire image.

8. The apparatus according to claim 1, wherein an image composited by the composition unit is set as the base image and the composition is repeatedly carried out to generate a final composite image.

9. An image compositing method comprising:
calculating a global motion vector reflecting an inter-image global motion of a base image and a reference image and calculating a local motion vector reflecting an inter-image local motion between the base image and the reference image for one of a pixel and a unit region consisting of pixels;
calculating moving region information, the moving region information indicating one of a moving region in which a subject is moving and a still region in which the subject is not moving, by estimating, in each unit region, a difference between from the global motion vector and the local motion vector, and using a predetermined relationship between the difference and a value of the moving region information;
generating a corrected reference image obtained by correcting the reference image based on the global motion vector and a corrected reference image obtained by correcting the reference image based on the local motion vector;
determining composition ratios for compositing the base image with the corrected reference image corrected based on the global motion vector and the corrected reference image corrected based on the local motion vector, by using the calculated moving image information and correlations between an image pixel of the base image to be processed and a target pixel of the corrected reference images; and
compositing the base image with the corrected reference image corrected based on the global motion vector and the corrected reference image corrected based on the local motion vector with the composition ratios having been determined,
wherein the composition ratio of the corrected reference image corrected based on the global motion vector is higher than the composition ratio of the corrected reference image corrected based on the local motion vector in a region indicated to be the moving region in which an absolute value of the difference between the global motion vector and the local motion vector is at or above a first threshold.

10. A program recording device that stores a program which is executed by a computer, the program causing the computer to:
calculate a global motion vector reflecting an inter-image global motion of a base image and a reference image and calculate a local motion vector reflecting an inter-image local motion between the base image and the reference image for one of a pixel and a unit region consisting of pixels;
calculate moving region information, the moving region information indicating one of a moving region in which a subject is moving and a still region in which the subject is not moving, by estimating, in each unit region, a difference between the global motion vector and the local motion vector, and using a predetermined relationship between the difference and a value of the moving region information;
generate a corrected reference image obtained by correcting the reference image based on the global motion vector and a corrected reference image obtained by correcting the reference image based on the local motion vector;
determine composition ratios for compositing the base image with the corrected reference image corrected based on the global motion vector and the corrected reference image corrected based on the local motion vector, by using the calculated moving image information and correlations between an image pixel of the base image to be processed and a target pixel of the corrected reference images; and
composite the base image with the corrected reference image corrected based on the global motion vector and the corrected reference image corrected based on the local motion vector with the composition ratios having been determined,
wherein the composition ratio of the corrected reference image corrected based on the global motion vector is higher than the composition ratio of the corrected reference image corrected based on the local motion vector in a region indicated to be the moving region in which an absolute value of the difference between the global motion vector and the local motion vector is at or above a first threshold.

11. The apparatus according to claim 1, wherein the still region is a background portion.

12. The method according to claim 9, wherein the still region is a background portion.

13. The program recording device according to claim 10, wherein the still region is a background portion.

* * * * *